United States Patent [19]

Naganuma et al.

[11] Patent Number: 5,103,893

[45] Date of Patent: Apr. 14, 1992

[54] METHOD AND APPARATUS FOR DETECTING LEVEL OF MOLTEN METAL

[75] Inventors: Yoichi Naganuma; Masaki Motomura, both of Kitakyushu, Japan

[73] Assignee: Nippon Steel Corporation, Tokyo, Japan

[21] Appl. No.: 584,114

[22] Filed: Sep. 18, 1990

[30] Foreign Application Priority Data

Sep. 19, 1989 [JP] Japan ............................. 1-243117
Oct. 5, 1989 [JP] Japan ............................. 1-260690
Oct. 25, 1989 [JP] Japan ............................. 1-277667

[51] Int. Cl.$^5$ ........................................ B22D 11/16
[52] U.S. Cl. ........................................ 164/451; 164/150
[58] Field of Search ............. 164/451, 449, 4.1, 453, 164/450, 452, 150

[56] References Cited

U.S. PATENT DOCUMENTS

| | | | |
|---|---|---|---|
| 4,144,756 | 3/1979 | Linder | 164/453 |
| 4,212,342 | 7/1980 | Linder et al. | 164/449 |
| 4,279,149 | 7/1981 | Block . | |
| 4,441,541 | 4/1984 | Block . | |
| 4,529,029 | 7/1985 | Block . | |
| 4,794,335 | 12/1988 | Linder . | |
| 4,887,798 | 12/1989 | Julius | 266/99 |

FOREIGN PATENT DOCUMENTS

| | | |
|---|---|---|
| B1027 | 3/1988 | Australia . |
| 1198293 | 12/1985 | Canada . |
| 0133179 | 2/1985 | European Pat. Off. . |
| 0187993 | 7/1986 | European Pat. Off. . |
| 0192043 | 8/1986 | European Pat. Off. . |
| 0300150 | 1/1989 | European Pat. Off. . |
| 834783 | 5/1960 | United Kingdom ............. 164/453 |

*Primary Examiner*—Richard K. Seidel
*Attorney, Agent, or Firm*—Pollock, Vande Sande & Priddy

[57] ABSTRACT

A method of detecting the level of molten metal existing within a mold comprises the steps of disposing a transmission coil and a receiving coil opposite to each other with the mold interposed therebetween, applying an AC voltage to the transmission coil for producing an alternating magnetic flux such that at least a part of the magnetic flux passes through the mold and the molten metal, if any, and reaches the receiving coil, and determining the level of the molten metal on the basis of at least one of a voltage value and a phase of an AC signal induced in the receiving coil by the alternating magnetic flux, and an apparatus for carrying out the above method.

12 Claims, 4 Drawing Sheets

METHOD AND APPARATUS FOR DETECTING LEVEL OF MOLTEN METAL

BACKGROUND OF THE INVENTION

1. Field of the Invention

This invention relates to a method and an apparatus for detecting the position of the level of molten metal, and particularly to, a method and an apparatus for detecting the position of the level of molten metal within a mold in operation of a continuous casting apparatus.

2. Description of the Related Art

The following methods of detecting the position of the level of molten metal:

1) Use of a float

A float is floated on a molten metal are known in the art surface and the position of this float is detected by a bar, a chain or the like.

2) Use of an optical (optoelectric conversion) technique

Since the brightness changes at a boundary between the molten metal surface and the container such as a mold, this boundary is measured by triangulation technique using for example, a sensor array, television cameras or the like.

3) Use of an ultrasonic wave

The distance to a surface of molten metal is measured by a time required for an ultrasonic wave irradiated on the surface of the molten metal to return an original position after reflected by the surface of the molten metal.

4) Use of a radioactive ray

A radioactive ray is transmitted through the molten metal in a diagonal direction, and the surface level of the molten metal is detected from the amount in attenuation of the radioactive ray during transmission through the molten metal.

5) Use of a immersed electrode

The level of the molten metal is detected by turning on or off of an electric circuit provided by the molten metal and an immersed electrode.

6) Use of a thermocouple

Several thermocouples are buried in the outer surface of the wall of the container of the molten metal, and the level of the molten metal is indirectly detected from the changing point in the temperature distribution measured by the thermocouples.

7) Use of electromagnetic induction

For example, in the Japanese Patent No. 55-16749, a coil which is long in the depth direction of the container is provided on the outer surface of the wall of the mold and connected to one side of an impedance bridge circuit. Since the temperature of the mold wall changes with the change of the level of the molten metal within the mold, resulting in change of the specific resistance of the mold wall, the level of the molten metal is detected from the change of the eddy current produced in the mold wall due to the change of the specific resistance of the mold wall.

The conventional methods for detecting the level of the molten metal, however, involve the following problems:

1) Use of a float

The float is subjected to corrosion by the high-temperature molten metal, and also the slug, molten metal or the like is sometimes adhered to the float, thereby changing the specific gravity of the float, resulting in the necessity of the calibration.

2) Use for optical (optoelectric conversion) technique

When a smoke, dust or the like is present or when the slug (which generally provides a low brightness and looks black) is floated on the surface of the molten metal, the measurement is difficult. Further when the optical sensor portion is soiled by this smoke or the like, or when the molten metal is at a high temperature and the light is refracted by the heat waves, the measurement may involve errors.

3) Use of an ultrasonic wave

When the molten metal is at a high temperature, the air is waved (changed in its density) by the heat, causing complicated refraction of sound to disable the measurement.

4) Use of a radioactive ray

There is a problem with safety, and the radiation source and the detector must be placed in a special space.

5) Use of an immersed electrode

The electrode is consumed greatly in the high-temperature molten metal and thus cannot be used for a long time.

6) Use of a thermocouple

Since the container for the high-temperature molten metal is made of firebricks, its heat conduction is poor. Thus, not only is the measurement delayed but also the detection precision is poor. Moreover, it is difficult to bury the thermocouples in the container wall, or to exchange a broken thermocouple with a new one.

7) Use of electromagnetic induction (Japanese Patent Publication No. 55-16749).

The temperature change at the molten metal surface is indirectly measured as the temperature change on the mold wall. However, the temperature change on the mold wall at the molten metal surface is less sharp, thus causing measurement errors.

Moreover, since the mold is cooled, it is more difficult to detect this temperature change as an impedance change, thus inevitably causing measurement errors.

Further, in a recently developed continuous casting apparatus using a belt drive type mold, as disclosed, for example, in Japanese Patent laid-open No. JP-A-60-152347, it is required to continuously detect the level of the molten metal within the mold during operation. However, any of the conventional methods as above-mentioned is difficult to be used for the purpose, because the surface of the molten metal exposed to the top of this type of mold is small and various auxiliary devices for operation of the mold are disposed on the outside of the mold, resulting in insufficient physical space.

SUMMARY OF THE INVENTION

It is an object of the invention to provide a method and an apparatus for detecting the level of a high-temperature molten metal in a mold from outside of the mold without directly contacting the molten metal, without being much affected by the atmospheric conditions such as smoke, dust or heat and without the necessity of relatively large space.

It is another object of the invention to provide a method and an apparatus for continuously detecting the level of the molten metal in a mold of a continuous casting apparatus during operation thereof.

According to one aspect of the present invention, a method of detecting a level of a molten metal within a mold comprises the steps of disposing a transmission coil and a receiving coil opposite to each other with the mold interposed therebetween, applying an AC voltage to the transmission coil to produce alternating magnetic flux so that at least a part of the flux reaches the receiving coil through the mold and the molten metal, if any, and determining the level of the molten metal on the basis of at least one of a voltage value and a phase of an AC signal induced in the receiving coil by the alternating magnetic flux.

According to another aspect of the present invention, an apparatus for detecting a level of the molten metal within a mold comprises a transmission coil and a receiving coil disposed to opposite to each other with the mold interposed therebetween, means for applying an AC voltage to the transmission coil to produce alternating magnetic flux so that at least a part of the alternating magnetic flux reaches the receiving coil through the mold and the molten metal, if any, and means for detecting an AC signal induced in the receiving coil by the alternating magnetic flux and determining the level of the molten metal on the basis of at least one of a voltage value and a phase of the AC signal.

According to a further aspect of the present invention, the method and apparatus mentioned above are particularly used for detecting a level of a molten metal within a metal mold of a continuous casting apparatus during operation thereof.

DESCRIPTION OF THE PREFERRED EMBODIMENTS

Figure 1:
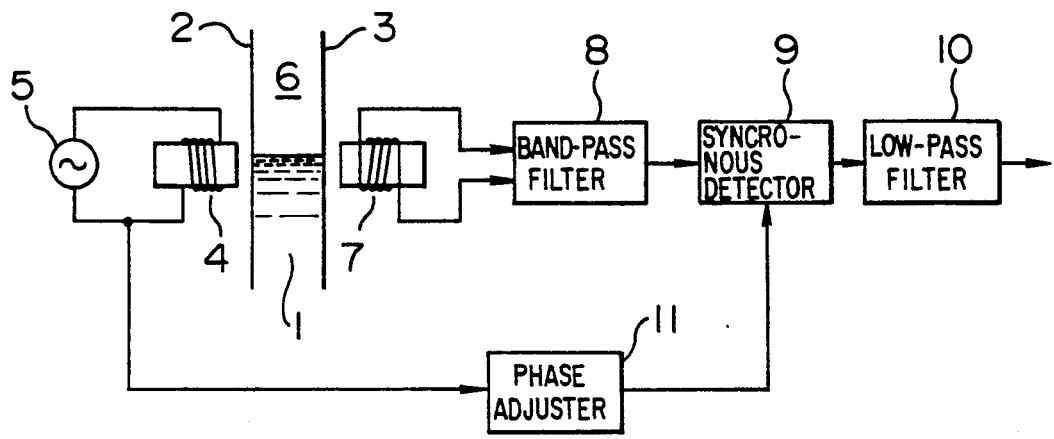
FIG. 1 is a block diagram of a first embodiment of this invention.

The first embodiment of the invention concerned with the detection of the level of the molten metal within a mold will be described with reference to FIG. 1. Referring to FIG. 1, there are shown side walls 2, 3 of a mold made of a thin steel plate, for example in, a continuous casting apparatus, and a molten steel 1. In the continuous casting apparatus, as is well known, the molten steel is poured into the mold from a tundish (not shown), and the molten steel is cooled within the mold to a half-solid steel which is drawn through a bottom opening of the mold. In this case, in order to maintain the level of the molten steel within the mold constant, it is necessary to detect the level of the molten steel.

As illustrated in FIG. 1, a transmission coil 4 wound on a ferrite core is provided on the outside of the side wall 2 of the mold, and an AC voltage is applied to the coil 4 from an AC power supply 5 so as to produce, alternating magnetic flux. A part of the alternating magnetic flux is distributed over and under the coil 4 and a part thereof enters into the side wall 2 of the mold made of a steel plate and transmits through the side wall 2 at its upper and lower portions. In addition, a very small part of the magnetic flux of which the density is small, penetrates the side wall 2 and passes through the molten steel 1 or air 6 or an intermediate portion including a boundary therebetween as shown in FIG. 1 depending on the level of the molten steel, to reach the side wall 3 of the mold. Part of the magnetic flux which has reached the side wall 3 enters into it and passes through the side wall 3 at its upper and lower portions. Then, a very small part of the magnetic flux reaches the receiving coil 7 thereby inducing a voltage signal in the coil 7. The value of the induced signal is very small because a very small amount of the magnetic flux reaches the receiving coil 7. According to an experimental study by the inventors, the value of the induced voltage in the receiving coil 7 is about 1/1000 of the voltage value of the AC power supply 5. Therefore, the measurement in the field is easily affected by detrimental noise components which are irrelevant to the measuring signal of the molten steel level. Thus, the inventors have succeeded in removing the detrimental noise components, and practical use of this kind of detector. That is, the output of the receiving coil 7 is first passed through a band-pass filter 8 which allows only the same frequency as that of the AC power supply 5 to pass therethrough so that the detrimental noise components can be removed by the filter.

The signal passed through the band-pass filter 8, however, may sometimes include a noise component of substantially the same frequency as that of the power supply. Thus, the phase of the AC power supply 5 is adjusted by a phase adjuster 11 to produce a signal having an adjusted phase matching that of the useful signal passed through the band-pass filter 8. The outputs of the band-pass filter 8 and the phase adjuster 11 are applied to a well-known synchronous detector 9 to extract from the output of the band-pass filter 8 only a component synchronized with the adjusted phase and to convert the component into a DC voltage signal. The components which are not synchronized with the adjusted phase (or undesired signals) are produced as AC voltages from the synchronous detector 9 and removed by a low-pass filter 10 which is capable of passing only a DC voltage and very low frequency components, so that only the useful signal of the DC signal component can be obtained. The phase adjuster 11 and the synchronous detector 9 may be any of well known types as disclosed, for example, in "Method of measurement of minute signal" in a catalogue of NF circuit design block, March, 1983.

When the molten metal 1 is filled in the mold, part of the magnetic flux which penetrated through the side wall 2 of the mold passes through the molten metal 1, thereby producing an eddy current within the molten metal. Since this eddy current is partially consumed in a form of Joule heat within the molten metal, the magnetic flux reaching the receiving coil 7 is very small.

Figure 3:
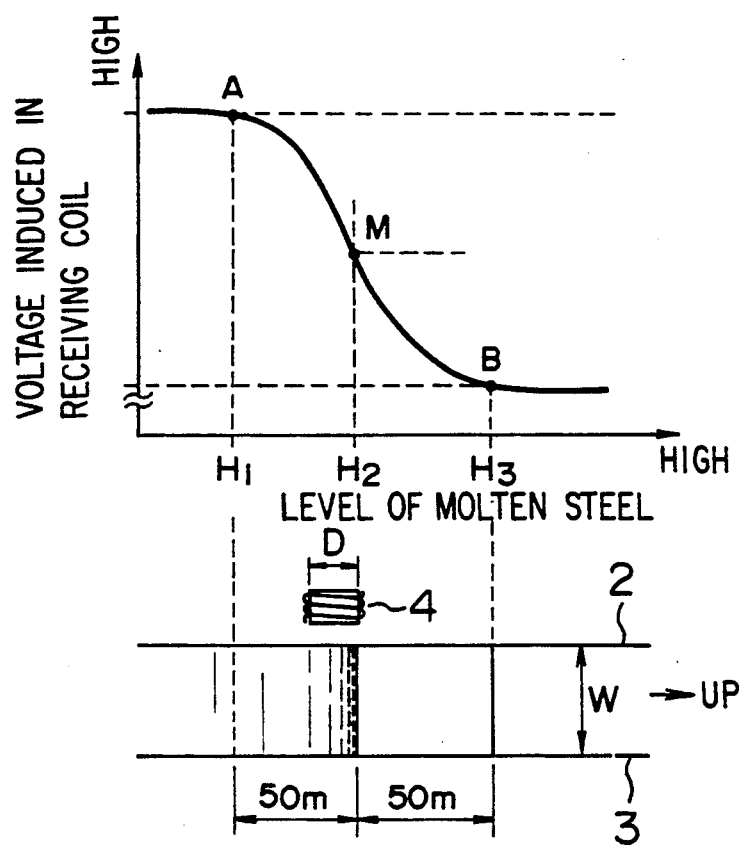
FIG. 3 is a graph showing the relation between the voltage induced in the receiving coil and the level of the molten metal in the arrangement of FIG. 1.

When no molten metal 1 is present within the mold, but only air 6 is filled within it, no eddy current is produced in the molten steel unlike the above case. Thus, the magnetic flux is less attenuated within the mold, or is not lost in a form of Joule heat, so that the amount of the magnetic flux reaching the receiving coil 7 is larger than that in the case in which the molten metal 1 is filled in the mold. FIG. 3 shows the relation between the measured value of the induced voltage in the receiving coil 7 and the level of the molten steel. In this graph, the width W of the mold is about 50 mm, the height (the dimension in the vertical direction) D of the rectangular cross-section of the transmission coil is about 40 mm, the mid point M in the graph indicates the induced voltage obtained when the level H2 of the molten steel coincides with the upper side of the transmission coil, and the maximum point A and the minimum point B in the graph indicate the induced voltages obtained when the molten metal is at a level H1 50 mm higher than H2 and at a level H3 50 mm lower than H2, respectively. In other words, the induced voltage is continuously changed as the level of the molten steel changes over the range of about 100 mm. Therefore, the change of the level of the molten steel over the range of about 100 mm can be detected by measuring this induced voltage. In the field of actual measurement, noise independent of the level of the molten steel is of course picked up, and hence the level of the molten steel is measured based on an output of a low-pass filter 10 shown in FIG. 1.

Figure 2:
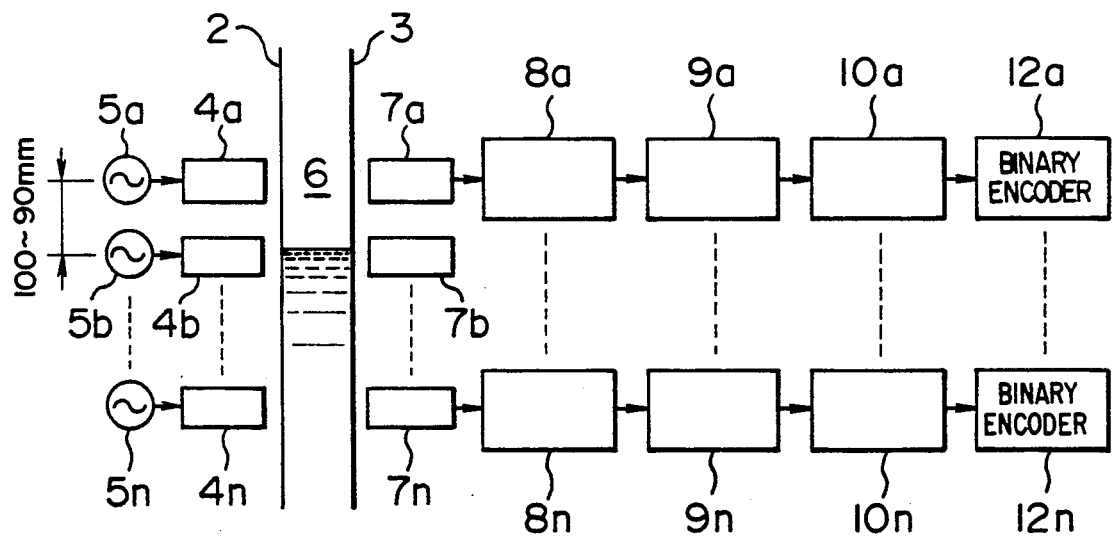
FIG. 2 is a block diagram of a modification of the first embodiment of the invention.

When the level of the molten steel is greatly shifted from the position of the transmission or receiving coil, for example, separated by 50 mm or more, the position of the level cannot be detected by the above method even though it is possible to detect whether the level is above or below the transmission or receiving coil position. In that case, as shown in FIG. 2, a plurality of sets of transmission coils $4a$, $4b$, ..., $4n$ and the receiving coils $7a$, $7b$, ..., $7n$ are oppositely disposed on the outside of the mold walls 2 and 3 within which the molten metal 1 is filled, at intervals in the vertical direction in which the level of the molten steel changes. The voltages of different frequencies from AC power supplies $5a$, $5b$, ..., $5n$ are supplied to the transmission coils $4a$, $4b$, ..., $4n$, respectively. Parts of the alternating magnetic flux produced by the coils are transmitted through the molten steel 1 or air 6 and the mold walls 2, 3 so as to reach the receiving coils $5a$, $5b$, ..., $5n$, thereby inducing AC voltages in the coils in the same manner as mentioned above. The induced voltages are respectively supplied through band-pass filters $8a$, ..., $8n$, and synchronous detectors $9a$, ..., $9n$ to low pass filter $10a$, $10b$, ..., $10n$ in the same way as described above. In the circuit arrangement shown in FIG. 2, phase adjusters corresponding to the phase adjuster 11 shown in FIG. 1 are also provided for the respective coil sets, but for the sake of simplicity they are not shown.

Moreover, the outputs of the low-pass filters $10a$, $10b$, ..., $10n$ are connected to binary encoders $12a$, $12b$, ..., $12n$, respectively. Each of the binary encoders produces a logical value of "1" when the output voltage of the corresponding low-pass filter is lower than a value corresponding to point M in FIG. 3, and a logical value of "0" when it is equal to or higher than the value corresponding to point M. As a result, it is determined from the outputs of the binary encoders whether the level of the molten steel is higher or lower than the upper edge of the corresponding transmission coil, or the position H2 of the level of the molten steel in FIG. 3. By providing a plurality of sets of transmission and receiving coils at proper intervals to cover a range in which the level of the molten steel is possibly changed, which region of the range where the level of the molten steel is positioned is determined based on the outputs of the binary encoders.

Figure 4:
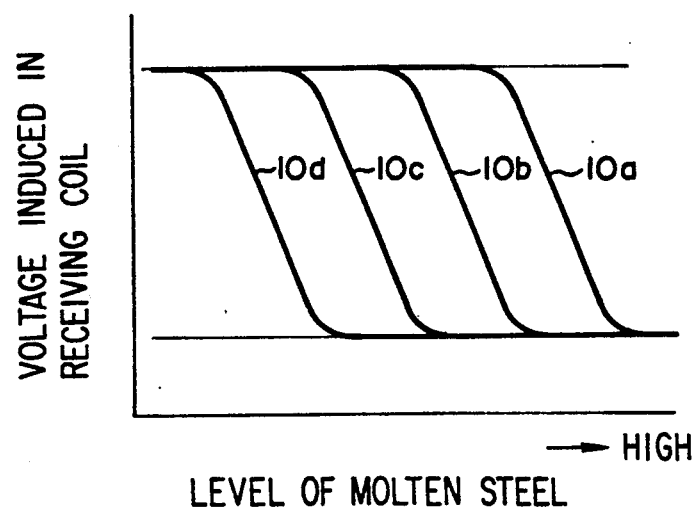
FIG. 4 is a graph showing the relation between the voltage induced in the receiving coil and the level of the molten metal in the arrangement of FIG. 2.

This method allows to determine in which one of the regions, each corresponding to half the interval between adjacent two sets of transmission and receiving coils, the level of the molten steel is located, but unable to continuously detect the change of the level of the molten steel. If it is desired to continuously detect the change of the level of the molten steel over a wide range, a plurality of sets of transmission and receiving coils are disposed in such a manner that the interval between every two adjacent sets is equal to, or slightly smaller than, a distance between the points H1 and H3 in FIG. 3. Then, the position of the level of the molten steel can be precisely detected from the output voltages of the low-pass filters of adjacent two sets of transmission and receiving coils of which the outputs of the corresponding binary encodes are, respectively, "1" and "0". FIG. 4 is a graph showing the relation between the level of the molten steel and the output (induced voltage in the receiving coil) of each of the low-pass filter $10a$, $10b$, $10c$, $10d$ of 4 sets of transmission and receiving coils arranged in this way.

While in this embodiment the mold is made of a steel plate, it may be made of other metal or a material such as firebrick.

Moreover, the molten metal to be measured may be other metal than steel, for example, aluminum.

Figure 6:
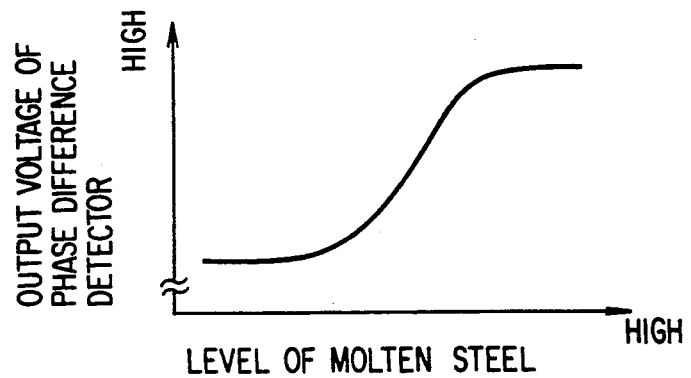
FIG. 6 is a graph showing the relation between the output of the phase detector and the level of the molten metal.
Figure 7:
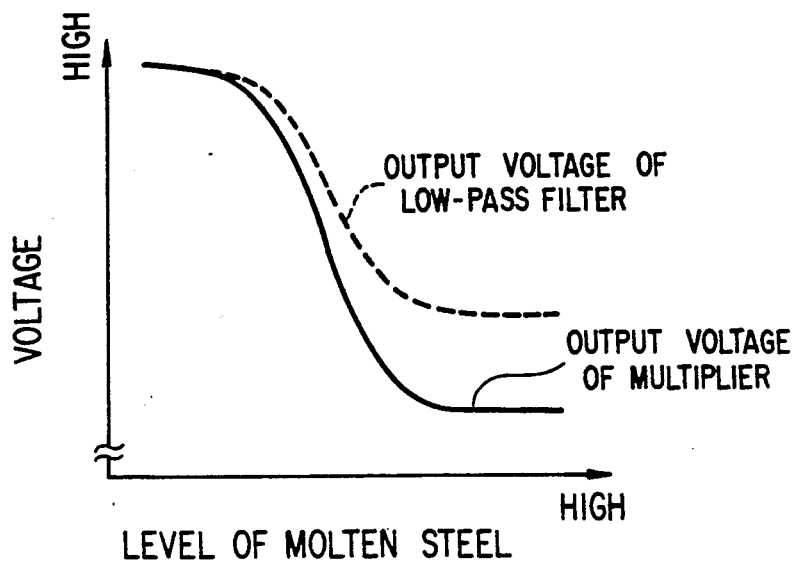
FIG. 7 is a graph showing the comparison between the output of the low-pass filter and a value of the output multiplied by the cosine of the phase difference in the arrangement of FIG. 5.

A second embodiment of this invention will be described with reference to FIGS. 5 to 7. In the arrangement shown in FIG. 5, the elements other than a phase difference detector 13, a cosine calculator 14 and a multiplier 15 are substantially the same a those in the first embodiment of FIG. 1. The second embodiment is an improvement in the detection sensitivity of the first embodiment. The phase of the AC power supply 5 is adjusted by a known phase adjuster 11 so that when no molten steel 1 is present within the mold, the phase of the useful AC signal, i.e. an output of the band-pass filter 8 is equal to that of the output of the phase adjuster 11, and hence the output of the phase difference detector 13 which converts the phase difference between them into a voltage signal is zero. When the output value of the phase difference detector 13 is zero, i.e. the phase difference $\Delta\phi = 0$, Cos $\Delta\phi = 1$ is produced from a cosine calculator 14. Thus, the output of a known multiplier 15 which produces a product of the value of cos $\Delta\phi$ and the output of the low-pass filter 10 is equal to the output of the low-pass filter 10. On the other hand, when the molten steel 1 is filled within the mold, part of the magnetic flux having penetrated the side wall 2 of the mold causes an eddy current within the molten steel during passing through the molten steel 1, and it thus lost as Joule heat. Consequently, the impedance of the receiving coil 7 equivalently represented by L (inductance) and R (resistance) is changed so that the phase of the voltage induced in the receiving coil is deviated by $\Delta\phi$ as compared with the case in which no molten metal 1 is present within the mold or only air is present. According to the experimental study by the inventors, when the frequency of the AC voltage of the AC power supply 5 is 600 Hz, the phase difference $\Delta\phi$ is 72 degrees. A signal corresponding to this phase difference $\Delta\phi$ is outputted from the phase difference detector 13 and converted into a value of Cos $\Delta\phi$ by the cosine calculator 14 as mentioned above. In case of $\Delta\phi$ being 72 degrees, Cos Δφ is 0.309 smaller than "1". As a result, the multiplier 15 produces a product of this value and the output value of the low-pass filter 10. Thus, the output value of the low-pass filter 10, which is smaller than a value of its output obtained when the molten metal is filled in the mold, is made further smaller by use of the multiplier 15. Generally, the value of the phase difference Δφ, or the output voltage of the phase difference detector 13 continuously increases as shown in FIG. 6, or decreases, as the level of the molten steel becomes higher in the vicinity of the position of the set of the transmission and receiving coils. In the above embodiment using the product of a value of Cos Δφ and the output value of the low-pass filter 10, the difference between the output of the low-pass filter 10 produced when the molten steel is filled in the mold and that produced when no molten steel exists, is magnified by using the multiplier 15 as shown by solid line in FIG. 7 as compared with the case using no multiplier as shown by broken line, thus resulting in increasing the sensitivity.

When the band width (frequency band) of the band-pass filter 8 is decreased, the noise signal detrimental to the measurement can be effectively decreased, but when it is too narrow, an error occurs in the measurement because a slight change of the frequency of the AC power supply 5 due to drift or the like may cause great shift in phase of the output of the band-pass filter when the frequency of the AC power supply 5 is changed from the center frequency of the band-pass filter 8. To avoid this effect, it is desired to make the band width wider or make the center frequency of the band-pass filter 8 slightly higher or lower than the frequency of the AC power supply 5.

Moreover, when the time constant of the low-pass filter 10 is increased, more stability is achieved against the undesired noise signal, but the measurement time delay is increased. Thus, the desired time constant will be about ⅓ the allowable delay time (in this embodiment, the time constant is 30 msec).

While in this embodiment the output of the phase difference detector 13 is zero when no molten steel 1 is present within the mold as described above, the same effect can be achieved by an arrangement in which the output of the phase difference detector 13 is made zero when the mold is filled with the molten steel 1, and a sine calculator is used in place of the cosine calculator 14.

A third embodiment of this invention will be described with reference to FIG. 8. While in the first embodiment the level of the molten steel is detected on the basis of the value of the voltage induced in the receiving coil, in the third embodiment the level of the molten steel is detected on the basis of the phase of the voltage signal induced in the receiving coil. While in the second embodiment the cosine of the output of the phase difference detector is used for improving the detection sensitivity in which case the output of the phase difference detector is continuously changed with change of the level of the molten steel as shown in FIG. 6, the third embodiment utilizes the change of the phase difference.

Figure 5:
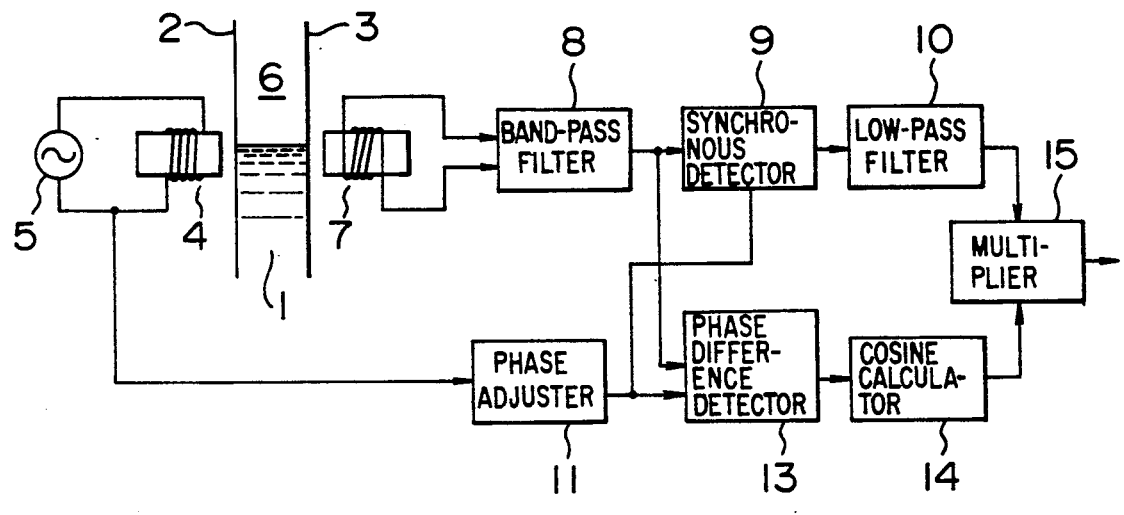
FIG. 5 is a block diagram of a second embodiment of the invention.
Figure 8:
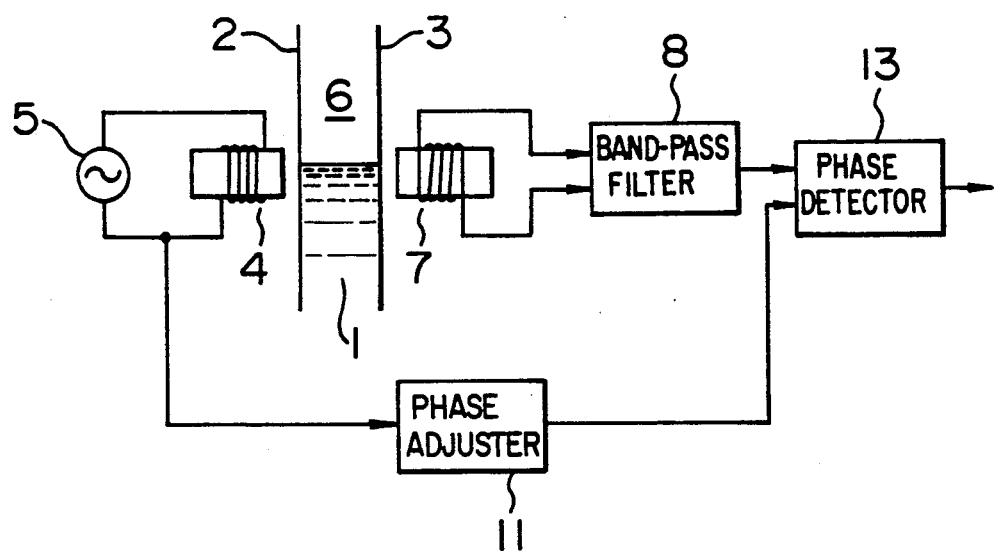
FIG. 8 is a block diagram of a third embodiment of the invention.

In FIG. 8 showing the third embodiment, like elements are designated by the same reference numerals as those in FIG. 5. The phase adjuster 11 adjusts the phase of the power supply so that the phase difference Δφ between the output of the low-pass filter and the output of the phase adjuster is 90° or 0° in electrical angle, when the level of the molten steel is, for example, below the transmission coil. In this case, the only one set of transmission and receiving coils is used as shown in FIG. 8, the phase adjuster is not always necessary, but when a plurality of sets of transmission and receiving coils are arranged as in FIG. 2, a phase adjuster must be provided for each set in order to adjust the outputs in the respective sets.

We claim:

1. A method of detecting a level of molten metal existing within a mold having at least two opposite side walls, comprising the steps of:
    disposing a transmission coil and a receiving coil opposite to each other and each facing the outer surface of the opposite side wall of the mold interposed between said coils;
    applying an AC voltage to said transmission coil for producing an alternating magnetic flux such that at least a part of said alternating magnetic flux passes through said mold and the molten metal, if any, and reaches said receiving coil; and
    determining the level of said molten metal on the basis of at least one of a voltage value and a phase of an AC signal induced in said receiving coil by the part of said alternating magnetic flux.

2. A method according to claim 1, wherein the level of said molten metal is determined on the basis of the voltage value of the AC signal induced in said receiving coil.

3. A method of detecting a level of molten metal existing within a mold having at least two opposite side walls, comprising the steps of:
    disposing a transmission coil and a receiving coil opposite to each other and each facing the outer surface of the opposite side wall of the mold interposed between said coils;
    applying an AC voltage to said transmission coil for producing an alternating magnetic flux such that at least a part of said alternating magnetic flux passes through said mold and the molten metal, if any, and reaches said receiving coil; and
    determining a voltage value of a component of the AC signal induced in said receiving coil, said component being in phase with the AC voltage applied to said transmission coil; and
    determining the level of said molten metal on the basis of said voltage value.

4. A method according to claim 3, further comprising the steps of determining a sine or cosine of a phase difference between the phase of the AC signal induced in said receiving coil and the phase of the AC voltage applied to said transmission coil, and obtaining a product of the sine or cosine of the phase difference and said voltage value of said in-phase component, said product being used to determine the level of said molten metal.

5. A method of detecting a level of molten metal existing within a mold having at least two opposite side walls, comprising the steps of:
    disposing a transmission coil and a receiving coil opposite to each other and each facing the outer surface of one of the opposite side walls of the mold interposed between said coils;
    applying an AC voltage to said transmission coil for producing an alternating magnetic flux such that at least a part of said alternating magnetic flux passes through said mold and the molten metal, if any, and reaches said receiving coil; and determining a phase difference between the phase of the AC signal induced in said receiving coil and the phase of the AC voltage applied to said transmission coil; and determining the level of said molten metal on the basis of said phase difference.

6. An apparatus for detecting a level of molten metal existing within a mold having at least two opposite side walls comprising:

a transmission coil and a receiving coil positioned opposite to each other and each facing the outer surface of the opposite side wall of the mold interposed between said coils;

means for applying an AC voltage to said transmission for producing alternating magnetic flux such that at least a part of said alternating magnetic flux passes through the mold and the molten metal, if any, and reaches said receiving coil; and means for determining the level of the molten metal on the basis of at least one of a voltage value and a phase of an AC signal induced in said receiving coil by said alternating magnetic flux.

7. An apparatus according to claim 6, wherein said means for determining the level of the molten metal includes means for determining the voltage value of the AC signal induced in said receiving coil and determining the level of the molten metal on the basis of said voltage value.

8. An apparatus for detecting a level of molten metal existing within a mold having at least two opposite side walls comprising:

a transmission coil and a receiving coil positioned opposite to each other and each facing the outer surface of the opposite side wall of the mold interposed between said coils;

means for applying an AC voltage to said transmission for producing alternating magnetic flux such that at least a part of said alternating magnetic flux passes through the mold and the molten metal, if any, and reaches said receiving coil; and means for detecting a voltage value of an AC signal induced in said receiving coil in phase with said AC voltage applied to said transmission coil; and determining the level of the molten metal on the basis of said voltage value of the AC signal induced in said receiving coil.

9. An apparatus according to claim 8, further comprising means for determining a sine or cosine of a phase difference between the phase of the AC signal induced in said receiving coil and the phase of the AC voltage applied to said transmission coil, and means for determining a product of the sine or cosine of said phase difference and the voltage value of said in-phase component, the level of said molten metal being determined by said product.

10. An apparatus for detecting a level of molten metal existing within a mold having at least two opposite side walls comprising:

a transmission coil and a receiving coil positioned opposite to each other and each facing the outer surface of the opposite side wall of the mold interposed between said coils;

means for applying an AC voltage to said transmission for producing alternating magnetic flux such that at least a part of said alternating magnetic flux passes through the mold and the molten metal, if any, and reaches said receiving coil;

means for determining a phase difference between the phase of the AC signal induced in said receiving coil and the phase of the AC voltage applied to said transmission coil; and means for determining the level of the molten metal on the basis of said phase difference.

11. A method of detecting the level of molten steel existing with a mold having at least first and second opposite side walls of continuous casting equipment, comprising the steps of:

disposing a transmission coil on the first side wall and a receiving coil on the second opposite side wall at the outside of said side walls of said casting equipment;

applying an AC voltage to said transmission coil for producing alternating magnetic flux such that at least a part of the alternating magnetic flux passes through said mold and said molten steel, if any, and reaches said receiving coil; and determining the level of the molten steel on the basis of at least one of a voltage value and a phase of an AC signal induced in said receiving coil by said alternating magnetic flux.

12. An apparatus for detecting the level of molten steel existing within a mold having at least first and second opposite side walls of continuous casting equipment comprising:

a transmission coil on the first side wall and a receiving coil on the second opposite side wall disposed at the outside of the side walls of said casting equipment;

means for applying an AC voltage to said transmission coil to produce alternating magnetic flux so that at least a part of the alternating magnetic flux passes through the mold and the molten steel, if any, and reaches said receiving coil; and means for determining the level of the molten steel on the basis of at least one of a voltage value and a phase of an AC signal induced in said receiving coil by said alternating magnetic flux.

* * * * *